US006224921B1

(12) United States Patent
Shih et al.

(10) Patent No.: US 6,224,921 B1
(45) Date of Patent: May 1, 2001

(54) RICE FLOUR BASED LOW OIL UPTAKE FRYING BATTERS

(75) Inventors: Frederick F. Shih, New Orleans; Kim W. Daigle, Mandeville, both of LA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/538,837

(22) Filed: Mar. 30, 2000

(51) Int. Cl.$^7$ .................................................. A21D 10/04
(52) U.S. Cl. ............................ 426/94; 426/102; 426/552
(58) Field of Search ............................ 426/94, 102, 552, 426/439

(56) References Cited

U.S. PATENT DOCUMENTS

| | | | |
|---|---|---|---|
| 5,750,168 | * 5/1998 | Woerman et al. | 426/102 |
| 5,885,639 | * 3/1999 | Judkins et al. | 426/303 |
| 6,022,569 | * 2/2000 | Rogols et al. | 426/102 |
| 6,080,434 | * 12/2000 | Horn et al. | 426/102 |
| 6,139,894 | * 10/2000 | Hoshino et al. | 426/549 |

\* cited by examiner

*Primary Examiner*—Nina Bhat
(74) *Attorney, Agent, or Firm*—M. Howard Silverstein; Joseph A. Lipovsky; John D. Fado

(57) ABSTRACT

Low oil uptake frying batters substantially based on rice flour have been developed that maintain desirable organoleptic properties while significantly reducing fat absorption during the frying process. This is accomplished by inclusion of cold water swelling rice-based starch products selected from the group consisting of pregelatinized rice flour, phosphorylated rice starch and pregelatinized acetylated rice starch into the rice starch batter compositions.

10 Claims, No Drawings

RICE FLOUR BASED LOW OIL UPTAKE FRYING BATTERS

BACKGROUND OF THE INVENTION

1. Field of the Invention

Comestibles such as meat, fish, poultry and vegetables are commonly batter-coated and then cooked by pan frying or deep fat frying. Batters enhance food sensory quality, but they also absorb oil during frying. The oil uptake in fried coating materials has become a concern, as excessive oil consumption is known to be a causative factor in obesity and many other health problems. In reaction to this awareness, pressure has increased from governmental and consumer groups to reduce the amount of oil and fat in foods.

The present invention relates to the development of rice-based frying batters which significantly reduce oil uptake during the frying process, while retaining desirable organoleptic properties.

2. Description of the Prior Art

Interactions during frying are believed to play an important role in determining the degree of batter oil uptake. Reduction of oil absorption in batters has been previously achieved through various means. Mechanical removal of excess oil has resulted in only minor reductions of fat. Solvent extraction has lacked commercial feasibility and public acceptance due to the potential for ingestion of residual chemicals. Use of barrier materials such as hydrated hydroxypropyl methylcellulose in frying compositions has been attempted by Meyers et al. (U.S. Pat. No. 4,900,537). This results in the formation of a gum which may be applied independently or as a mixture with a batter. The result is the creation of an oil barrier which decreases oil absorption and increases the level of water retention in the food product being fried. Other film-forming agents have also been reported to effect reduction in the oil absorption of batters upon frying. Olsen et al. (U.S. Pat. No. 4,511,583) teach the utility of gelatin and certain starches in forming films that prevents oil absorption of the finished breading product upon frying.

Numerous starch products have been used for inclusion into the batter which are claimed to reduce the extra oil absorption from the coating material. The term starch is used herein to include various modified starches such as dextrins, oxidized starch, and other starch derivatives. Generally, however, the addition of these starch products to traditional wheat flour based batters result in modest, if any reductions in oil absorption, e.g., up to 3% to 5% reductions in the oil absorbed. Apparently, even though these starches themselves may have good film-forming and oil-resisting properties, their presence is too little (normally less than 10% of the batter) to effect any significant reduction in the total oil absorption. Rarely are they used at ratios higher than 15%, especially for tempura types of batters, because good film-forming materials or thickeners when used as the main body of the batter result in low coating pickup and poor textural quality when fried.

SUMMARY OF THE INVENTION

It has now been discovered that organoleptically acceptable rice based batters with the property of reduced oil uptake upon frying may be produced through the inclusion in the batter mix of a cold water swelling rice based starch product selected from the group consisting of pregelatinized rice flour, phosphorylated rice starch, and pregelatinized acetylated rice starch. When used in the compositional proportions of the presently taught invention, the present batter mixes produce products with significantly reduced oil content as compared to their wheat based counterparts.

In accordance with the present discovery, it is an object to provide novel batter compositions which, in addition to desirable coating and frying properties of traditional batters, also have the characteristics of substantially reducing the batter oil uptake during frying.

Other objects and advantages of the invention will become readily apparent from the ensuing description.

DETAILED DESCRIPTION OF THE INVENTION

The present invention is based in part upon the insight of the inventors that the property of low oil uptake upon frying may be acquired from the cereal flour component of the batter composition rather than from the inclusion of oil reducing additives. Instead of relying upon these oil-reducing additives, strongly oil-resisting rice-based flours are chosen as the main body of the batter base.

Because these batter-base materials lack functional properties desirable for batters, additives such as cold water swelling rice based starch products selected from the group consisting of pregelatinized rice flour, phosphorylated rice starch, and pregelatinized acetylated rice starch are used to enhance the viscosity of the batter slurry and, subsequently, the textural and sensory quality of the fried batter. Batter base materials are chosen for their strong oil-resisting characteristics. Because of this, optimal compositions for achieving minimal oil absorption are created by maximizing the main body batter base and minimizing batter additives. This approach has particular economic benefit because additives are normally significant cost components of the batter. The batter compositions of the present invention thus contain strongly oil-resisting materials as the main body and small amounts of additives providing viscosity and pasting properties suitable for food-coating and the development of desirable textural and organoleptic properties upon frying.

The compositions and methods of the present invention are to be practiced, with or without breading, with comestibles which are to be subsequently fried or par-fried. Appropriate comestibles include such categories as meat, fish, poultry and vegetables. While the choice of particular commodity, as well as its form, would be a matter of simple alternative to the practicing artisan, an exemplary and non-exhaustive list of usable materials is seen to include pork cutlets, beef cutlets, chicken drumsticks, chicken cutlets, shrimp, fish patties, and vegetable strips, e.g., onion, potato, carrot, sweet potato, pepper and okra.

Wheat flours, while commonly used as the main body of batter bases, have relatively high oil absorbing capacities. This is postulated to be due in part to their being rich in gluten, a protein with great affinity for oil. Rice flours, while typically possessing a protein content of about 6–9%, are gluten free and have been found to possess superior oil resisting properties. Particularly suitable as batter bases for the instant invention are flours from long grain rice which have a starch content at about 87–95% and an amylose/amylopectin ratio ranging from about 18:82 to about 22:78, preferably about 20:80. These rice flours are highly nutritious, hypoallergenic, and particularly safe for human consumption.

While long grain rice flours have superior properties with regard to reduced oil adsorption upon frying, they lack desirable characteristics, such as thickening and pasting properties, that are of great functional importance to batters.

In the present invention these shortcomings are overcome by the inclusion of additives that are able to thicken and swell the rice based batter but not appreciably interfere with the batter's property of low oil absorption. In the present invention it has been discovered that additives particularly suitable in maintaining the low oil absorption capacity of rice based batters are found to be cold water swelling rice based starch products selected from the group consisting of pregelatinized rice flour, phosphorylated rice starch, and pregelatinized acetylated rice starch.

Pregelatinization of starch is a process of precooking starch to produce materials that hydrate and swell in cold water. Products are called pregelatinized starches or "pregels" when heated beyond the pasting temperature of the flour. Drum drying is the most common method of preparation, but spray drying and extrusion cooking are alternative methods. Processing conditions such as water content, time, and temperature can be varied to produce different products. We have used both commercial drum-dried and lab-prepared extrusion-cooked pregelatinized products. Both types were effective for our purposes.

Starch phosphate esters are useful starch derivatives, prepared by chemical modification, for improved food-use functional properties. The rice starch phosphates of the present invention were prepared by methods disclosed in U.S. Pat. No. 2,884,412 (hereby incorporated by reference), as follows: An approximately equimolar mixture of monosodium phosphate monohydrate and disodium phosphate dodecahydrate present in amounts ranging from about 0.025 moles to about 0.25 moles of each material may be dissolved in 190 g water. Rice starch (180 g) is then added, stirred for 10 min, and then filtered. The filter cake is then broken up, air dried, and heated in an oven for about 4 hr at a temperature between 145° C. and 155° C. Depending on the reaction temperature and the ratio of the phosphorylating reagent and starch, the resulting products contained bound phosphorus in amounts ranging from 0.4% to 1.6% by weight.

Acetylated starches are prepared by crosslinking of the starch with adipic acetic mixed anhydride to form a distarch adipate. These distarch adipates are made by esterification of the starch granule in aqueous suspension under mildly alkaline conditions with a mixed anhydride prepared by reacting adipic acid with acetic anhydride. The acetylated starches used in the present invention are made from waxy rice utilizing known methods as taught by Wurzburg in U.S. Pat. No. 2,935,510 (hereby incorporated by reference).

These derivatives are modified starches or flours from various rice sources, preferably from long grain rice flour. Also preferably, the pregelatinized starch derivatives are almost totally modified (greater than about 90%, preferably greater than about 98% gelatinization), and the phosphorylated starch derivatives are extensively modified (preferably greater than 1.0% phosphorus).

While not considered as part of the instant invention, compositional adjuvants such as salt, leavening agents, spices, humectants, and colorants may optionally be included with the determination of particular material and its amount being within the purview of the practicing artisan. Conventional batter formulations, in addition to the flour base, incorporate materials such as sodium bicarbonate and various combinations of acid and base for the purpose of leavening. Additional optional ingredients may include small amounts of flours from other cereal sources, oil, dairy powders, gums, flavorings, and seasonings.

In the batter system of the present invention, the flour component consists substantially of long grain rice which has the property of being oil-resisting. "Substantially" within the meaning of the instant invention, is herein defined to mean more than 50% by weight of the batter flour component. The minority flour component, if present, may be selected from any flours known and conventional in the art including but not limited to those based on wheat, corn, and rice. In alternate embodiments of the present invention, the flour component consists essentially of long grain rice; with "essentially" being defined herein to mean greater than about 99% by weight of the batter flour component. This, along with the cold water swelling rice based starch product selected from the group consisting of pregelatinized rice flour, phosphorylated rice starch, and pregelatinized acetylated rice starch, constitute the critical batter components. Usable proportional ranges of the flour and cold water swelling rice based starch product in the present inventive batter compositions range, on a dry weight basis, from about 85% to about 98%, and from about 2% to about 10% respectively.

In the case that the cold water swelling rice based starch product is pregelatinized rice flour, then envisioned proportions of the flour and pregelatinized rice flour would range, on a dry weight basis, from about 85% to about 98%, and from about 5% to about 10% respectively.

In the case that the cold water swelling rice based starch product is phosphorylated rice starch, then envisioned proportions of the flour and phosphorylated rice starch would range, on a dry weight basis, from about 85% to about 98%, and from about 2% to about 10% respectively.

In the case that the cold water swelling rice based starch product is pregelatinized acetylated rice starch, then envisioned proportions of the flour and pregelatinized rice starch would range, on a dry weight basis, from about 89% to about 98%, and from about 2% to about 6% respectively.

For easy comparison and evaluation, an equal amount of a standard acid/base leavening mixture including from about 2% to about 4%, preferably about 3.0% sodium chloride; from about 0.5% to about 1.5%, preferably about 1.0% sodium bicarbonate; and from about 0.5% to about 1%, preferably about 0.7% sodium pyrophosphate is added as the only other critical ingredient. The aforementioned percentages are all given on the basis of the dry weight of the batter composition. It is understood that other leavening reagents and optional ingredients can also be used, if desired, for the development of specific textural and sensory characteristics.

In the coating of the comestibles, the batter mix is added and stirred in water at mass ratios ranging from about 1:1 to about 1:3 (weight/weight) to create a slurry. The viscosity of the batter slurry influences the coating properties such as the mass pickup or add-on which, in turn, determine the total oil absorption from the fried batter. Normally, a thicker batter results in good adhesion and encapsulation properties, whereas a thin batter is more likely to develop void or blow-off problems. However, excessively thick coatings cause excessive pickup and total oil absorption. They also lose consumer appeal and may taste "bready". It is essential, therefore, that, through adjustment of water content, the viscosity of the batter slurry be maintained in a desirable range for easy, consistent and effective food-coating operation. For purposes of this invention appropriate batter viscosity ranges from about 1000 cP to about 2400 cP, as measured with a Rapid Visco Analyzer (Foss Food Technology). For tempura types of coating (batter-coated comestibles without being dusted with breading), suitable slurry viscosity could range from 1000 cP to 2400 cP and coating pickup (wet or dry) from 10% to 40%. For reliable sample comparison and evaluation, the viscosity is preferably adjusted to a range from 1200 cP to 2040 cP and thereon the corresponding batter pickups (wet or dry) may range from 12% to 24%. When breading is applied to the batter-coated comestibles, the total add-on (batter and breading) is controlled to 20–35% by keeping the batter viscosity in a relatively lower range from 420 cP to 720 cP.

The following examples are intended only to further illustrate the invention and are not intended to limit the scope of the invention which is defined by the claims.

EXAMPLE 1

A batter base was prepared containing 1.0% sodium bicarbonate, 3.0% sodium chloride, 0.72% pyrophosphate, 95.28% rice or wheat flour and various additives as set forth in Table 1 below. A slurry was prepared by mixing 100 g of the batter base with various amount of water (96–150 g) at room temperature for 5 min. After equilibrating for another 5 min, the batter slurry was analyzed for viscosity and subjected to deep-fry treatment, which was conducted with an oil bath at 350° F. in a 6 qt Dazey Deep-Fryer (Dazey Company, New Century, KS) for 6 min. Frying properties were evaluated by observation of the slurry processing qualities and the resultant qualities of the fried products. After being removed from the oil bath, the fried batter was drained in a strainer, ground in a food processor, and analyzed for oil content.

TABLE 1

| Batter slurry[a] | Viscosity (cP) | Oil uptake (%) | Frying Evaluation[b] |
|---|---|---|---|
| Rice flour | 1452 | 15.5 | + + |
| Wheat flour | 1584 | 50.2 | + + + + + |
| Rice and wheat (1:1) | 1020 | 46.3 | + + |
| Rice flour with (A) | 1824 | 22.2 | + + + + |
| Rice flour with (B) | 2400 | 22.6 | + + + + + |
| Rice flour with (C) | 2340 | 28.7 | + + + + |
| Rice flour with (D) | 1296 | 21.1 | + + + + |
| Rice flour with (E) | 1608 | 29.1 | + + + + |
| Rice flour with (F) | 1068 | 20.2 | + + |

[a]Batter slurries contained rice and/or wheat flour, partially replaced by additives at ratios as follows: (A) 7% pregelatinizd rice flour; (B) 3% phosphorylated rice starch (1.6% phosphorus); (C) 1% propylene glycol alginate; (D) 2% acetylated rice starch; (E) 5% phophorylated corn starch (% phosphorus); (F) 5% corn (waxy) corn starch
[b]A rating of 5 plus (+) refers to a batter with characteristics comparable to those of a wheat flour based batter with the slurry viscosity ranging from 1200 to 2400 cP and, on frying, a brown color crust and desirable crispy texture. Lower quality batters are given fewer plus (+) ratings, and ratings lower than 3 (+) are considered unacceptable for use as food batters.

The results demonstrate that rice flour based batter absorbed about 69% less oil than its equivalent wheat based counterpart. The rice flour based batter was however rated significantly inferior in frying properties. Inclusion of pregelatinized and phosphorylated starches in the rice flour base produced products showing both outstanding frying properties while retaining the desired characteristic of substantially reduced oil uptake, as compared to wheat based batter systems.

EXAMPLE 2

Chicken drumsticks were coated with the batter slurries, prepared as in Example 1, of rice and/or wheat flour with optional inclusion of phosphorylated rice starch or pregelatinized rice flour. Chicken drumsticks were weighed before and after dipping and coating with the batter. Wet pickup was calculated as % ratio of the weight of batter coating divided by the total weight of batter-coated drumstick. Frying was conducted with an oil bath at 350° F. for 10–12 min; until temperature at the bone reached 170° F. as measured by a thermometer probe. After frying, the batter coated drumsticks were weighed, and the batter crust peeled off and retained for oil analysis. Batter weight was determined as the difference between the weights of the battered drumstick and the peeled and washed drumstick. Dry pickup was determined as the batter weight per 100 g of the battered and fried drumstick. Results of analysis are shown in Table 2.

TABLE 2

| Batter | Rice (g) | Wheat (g) | Additive (g) | % Pickup[c] (wet) | % Pickup[c] (dry) | % Oil Uptake[d] (batter) | % Oil Uptake[d] (total) |
|---|---|---|---|---|---|---|---|
| A | — | 95.28 | — | 13 | 15 | 37.6 | 5.64 |
| B | 47.64 | 47.64 | — | 12 | 13 | 27.0 | 3.51 |
| C | 94.38 | — | 0.95[a] | 19 | 12 | 19.5 | 2.34 |
| D | 92.42 | — | 2.86[a] | 21 | 20 | 14.4 | 2.88 |
| E | 88.60 | — | 6.68[b] | 18 | 12 | 20.2 | 2.40 |

[a]Modified rice starch with 1.64% phosphorus.
[b]Pregelatinized long grain rice flour.
[c]The weight of batter per 100 g of the battered drumstick before (wet) and after (dry) frying.
[d]The % oil uptake (batter) is the oil absorbed in 100 g batter, and the % oil uptake (total) is the total oil absorption from the batter per 100 g battered drumstick.

The results confirm findings in Example 1 that rice based batters with pregelatinized or phosphorylated starch as additives showed outstanding frying properties and substantially reduced oil uptake as compared with the wheat flour based batter.

EXAMPLE 3

Batter slurries of rice and/or wheat flour bases with or without additives were prepared as in Example 1. Okra cutlets were weighed before and after batter coating. Wet pickup was calculated as % ratio of the weight of batter coating divided by the total weight of batter-coated drumstick. Frying was conducted with an oil bath at 350° F. for 6 min. After frying, the batter coated okra was weighed, and the batter crust peeled off and retained for oil analysis. Batter weight was determined as the difference between the weights of the battered okra and the peeled okra. Dry pickup was determined as the batter weight per 100 g of the battered and fried okra. Results of analysis are shown in Table 3.

The results confirm findings in Example 1 that rice based batters with pregelatinized starch as additives showed outstanding frying properties and substantially reduced oil uptake as compared with the wheat flour based batter.

TABLE 3

| Batter[a] | Viscosity (batter) cP | Total Add-On[b] (Wet) | Total Add-On[b] (dry) | Oil Uptake[c] (batter) | Oil Uptake[c] (total) | Evaluation[d] |
|---|---|---|---|---|---|---|
| Wheat flour (46% solids) | 1344 | 24.9 | 54.6 | 36.1 | 23.8 | + + + + + |
| Rice flour (51% solids) | 1488 | 33.1 | 59.2 | 17.0 | 10.0 | + + |
| Rice flour (46% solids w/5% add. A) | 1572 | 36.5 | 66.0 | 25.5 | 16.8 | + + + + |

[a]Batter preparation is as described in Footnote a in Table 1.
[b]Total add-on is the weight of batter in grams per 100 g of the batter coated okra before (wet) and after (dry) the frying.
[c]Oil uptake is calculated as described in Footnote d in Table 2.
[d]Rating of frying properties is as described in Footnote b in Table 1.

EXAMPLE 4

Batter slurries, prepared from dry batter mixes as in EXAMPLE 2, were used for coating deshelled shrimp (9–11 g/piece). The coated shrimp was dusted with the same dry batter mix before being deep fat fried. The initial batter viscosity was adjusted, as shown in Table 3, so that, after frying, the total dry pickup (batter and breading) ranged from 30% to 35%. The frying was conducted at 360° F. for 4 min. Methods of analysis were as described in earlier examples.

TABLE 4

| Batter[a] | Viscosity (batter) cP | Total Add-On[b] (Wet) | (dry) | Oil Uptake[c] (batter) | (total) | Evaluation[d] |
|---|---|---|---|---|---|---|
| Wheat flour (38% solids) | 516 | 23.8 | 35.5 | 31.51 | 11.2 | +++++ |
| Rice flour (45% solids) | 708 | 21.5 | 32.2 | 24.89 | 8.0 | ++ |
| Rice flour (30% solids w/21% add. A) | 444 | 24.7 | 34.9 | 24.08 | 8.4 | ++++ |

[a]Batter preparation is as described in Footnote a in Table 1.
[b]Total add-on is the sum of batter and breading in grams per 100 g of the batter-breading coated shrimp before (wet) and after (dry) the frying.
[c]Oil uptake is calculated as described in Footnote d in Table 2.
[d]Rating of frying properties is as described in Footnote b in Table 1.

The results confirm that the low fat uptake batter system as shown in Examples 1 and 2 can be effectively applied to the coating of comestibles such as shrimp utilizing conventional batter and breading routines.

It is understood that the foregoing detailed description is merely given by way of illustration and that modification and variations may be made therein without departing from the spirit and scope of the invention.

We claim:

1. A food coating batter, having the property of reduced oil uptake upon frying, comprising on a dry basis (w/w):
    a) from about 85% to about 98% flour consisting substantially of long grain rice; and
    b) from about 2% to about 10% of a cold water swelling rice based starch product selected from the group consisting of pregelatinized rice flour, phosphorylated rice starch, and pregelatinized acetylated rice starch; with the sum of said ingredients being combined with water in a ratio ranging from about 1:1 to about 1:3 (w/w); with said batter possessing a viscosity ranging from about 1000 cP to about 2400 cP.

2. A food coating batter of claim 1, comprising on a dry basis (w/w):
    a) from about 85% to about 95% flour consisting substantially of long grain rice; and
    b) from about 5% to about 10% pregelatinized rice; with the sum of said ingredients being combined with water in a ratio ranging from about 1:1 to about 1:3 (w/w); with said batter possessing a viscosity ranging from about 1000 cP to about 2400 cP.

3. The batter of claim 2 wherein said flour component consists essentially of long grain rice.

4. The batter of claim 2 further comprising on a dry basis (w/w):
    a) from about 0.5% to about 1.5% sodium bicarbonate;
    b) from about 2% to about 4% sodium chloride; and
    c) from about 0.5% to about 1% pyrophosphate.

5. A food coating batter of claim 1 comprising on a dry basis (w/w):
    a) from about 85% to about 98% flour consisting substantially of long grain rice; and
    b) from about 2% to about 10% phosphorylated rice starch; with the sum of said ingredients being combined with water in a ratio ranging from about 1:1 to about 1:3 (w/w); with said batter possessing a viscosity ranging from about 1000 cP to about 2400 cP.

6. The batter of claim 5 wherein said flour component consists essentially of long grain rice.

7. The batter of claim 5 further comprising on a dry basis (w/w):
    a) from about 0.5% to about 1.5% sodium bicarbonate;
    b) from about 2% to about 4% sodium chloride; and
    c) from about 0.5% to about 1% pyrophosphate.

8. A food coating batter of claim 1 comprising on a dry basis (w/w):
    a) from about 89% to about 98% flour consisting substantially of long grain rice; and
    b) from about 2% to about 6% pregelatinized acetylated rice starch; with the sum of said ingredients being combined with water in a ratio ranging from about 1:1 to about 1:3 (w/w); with said batter possessing a viscosity ranging from about 1000 cP to about 2400 cP.

9. The batter of claim 8 wherein said flour component consists essentially of long grain rice.

10. The batter of claim 8 further comprising on a dry basis (w/w):
    a) from about 0.5% to about 1.5% sodium bicarbonate;
    b) from about 2% to about 4% sodium chloride; and
    c) from about 0.5% to about 1% pyrophosphate.

* * * * *